Dec. 13, 1960  W. H. SCHRAY  2,964,326
COLLAPSIBLE CHILD'S SEAT FOR A NESTING SHOPPING CART
Filed Feb. 18, 1959  2 Sheets-Sheet 1
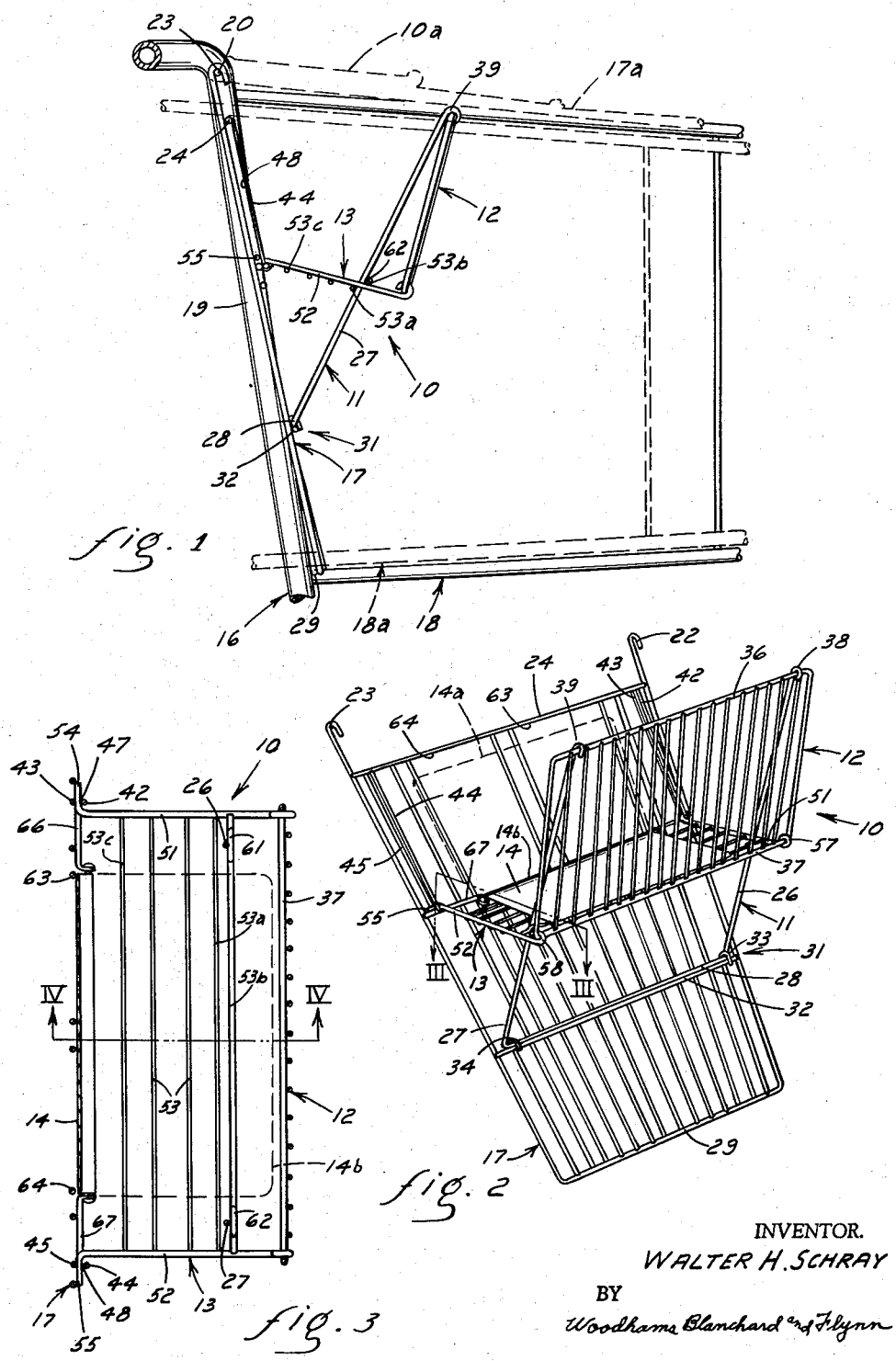
INVENTOR.
WALTER H. SCHRAY
BY
Woodhams, Blanchard and Flynn
ATTORNEYS Dec. 13, 1960 W. H. SCHRAY 2,964,326
COLLAPSIBLE CHILD'S SEAT FOR A NESTING SHOPPING CART
Filed Feb. 18, 1959 2 Sheets-Sheet 2
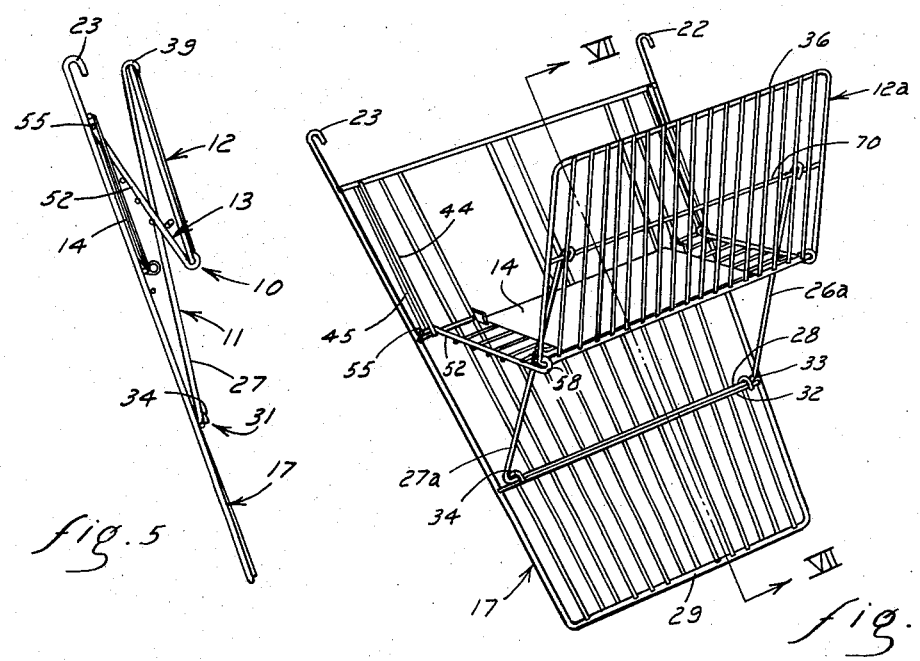
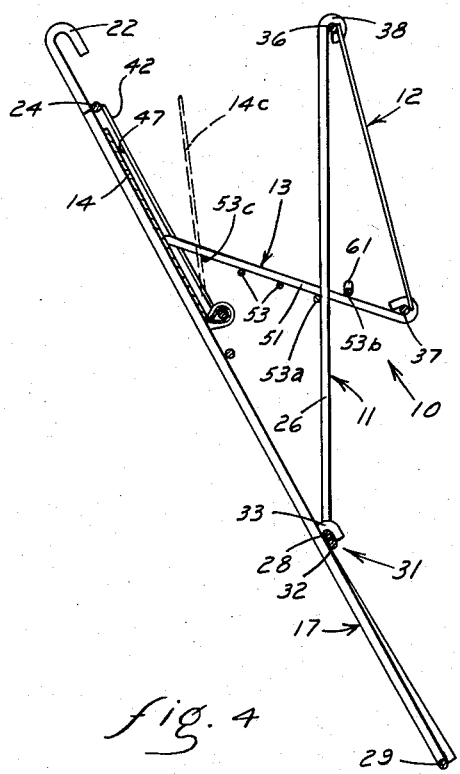
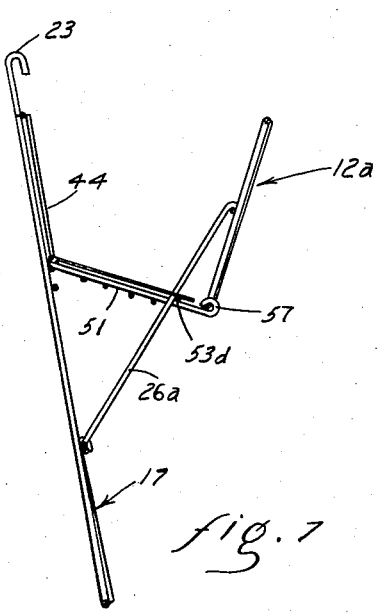
INVENTOR.
WALTER H. SCHRAY
BY
Woodhams Blanchard & Flynn
ATTORNEYS United States Patent Office 2,964,326
Patented Dec. 13, 1960

2,964,326

COLLAPSIBLE CHILD'S SEAT FOR A NESTING SHOPPING CART

Walter H. Schray, Battle Creek, Mich., assignor to United Steel & Wire Co., Battle Creek, Mich., a corporation of Michigan Filed Feb. 18, 1959, Ser. No. 794,064

7 Claims. (Cl. 280—33.99)

This invention relates in general to a collapsible seat construction for supporting a child upon a shopping cart having a large article receiving basket and, more particularly, to a type of collapsible seat construction which is completely supported upon an end wall of said basket, which end wall is pivotally suspended for movement around a horizontal axis to permit nesting of the shopping cart.

Many attempts have been made to provide a completely satisfactory collapsible seat structure for supporting a child in a shopping cart, particularly of the nesting type. However, the existing seat constructions which are presently in use for the purpose of fulfilling this established need, are not completely satisfactory for one or more of the following reasons:

The seat structure including the collapsing mechanism is in many cases too complicated for the inexpensive assembly procedures which are necessary in a highly competitive market; the seat supporting structure, when the seat is in operating position, often blocks and makes useless a substantial amount of area located within the article carrying basket below the seat structure; the seat structure will in many instances not collapse easily or automatically when the pivoted end wall upon which it is supported is moved into the nesting or raised position; the leg openings through the end wall of the basket are usually not easily closed when it becomes desirable to use the seat construction as an auxiliary compartment for carrying small or easily damaged articles; where a separate panel is provided to cover either the leg openings or the seat panel, said panel normally tends to remain with the seat frame rather than in a position covering the leg openings of the end wall with the result that packages are often inadvertently placed in the seat construction when the seat panel is down and said packages may fall through the leg openings and become damaged; and many present seat structures are relatively complex with numerous hinges and pivots so that they can be easily damaged and made inoperable.

In a continuing effort to improve upon existing collapsible seat structures, several of which have been developed by the assignee of this application, there is disclosed herein an improved seat construction, which is believed to overcome in particular the problems above outlined calling for simplicity of design and calling for means for automatically placing the seat panel in front of the leg openings when the seat structure is first opened. The construction of the present invention also overcomes other problems, including those others also above outlined, which have developed from the use of existing seat constructions.

Accordingly, a primary object of this invention has been the provision of a collapsible seat construction for a shopping cart having a large article receiving basket, said seat construction being supported upon one end wall thereof.

A further object of this invention has been the provision of a collapsible seat construction, as aforesaid, which is especially designed for support entirely by and upon a pivoted end wall of said article receiving basket on a nesting type shopping cart, wherein the seat construction is disposed within the basket and will collapse automatically as the pivoted end wall is moved into a raised, substantially horizontal position during a nesting operation.

A further object of this invention has been the provision of a collapsible seat construction, as aforesaid, which is extremely simple in construction and operation, which can be moved into and/or out of its operating position while the basket is in a partially loaded condition with no material interference from the articles within the basket, including articles which occupy that area in the basket directly below the seat frame of the seat construction.

A further object of this invention has been the provision of a collapsible seat construction, as aforesaid, wherein the seat panel covering the seat frame is automatically moved into a position covering the leg openings through the pivoted end wall whenever the seat is collapsed against the end wall, and wherein said seat panel remains in such position against the end wall when the seat is opened into its operating position, thereby greatly reducing the chance of having said articles slip inadvertently through the leg openings while the seat panel is covering the seat frame.

A further object of this invention has been the provision of a collapsible seat construction, as aforesaid, which is relatively simple and inexpensive to manufacture, which is very durable in construction, which will perform even under rigorous conditions of operation for long periods of time without any need for maintenance, which is completely safe and foolproof in its operation and use, which is pleasing in its appearance and which requires no further support other than that supplied by the end wall itself.

Other objects and purposes of this invention will become apparent to persons familiar with this type of equipment upon reading the following specification and examining the accompanying drawings, in which:

Figure 1 is a side elevational view of a collapsible seat construction in combination with a portion of a shopping cart with which it may be used.

Figure 2 is an oblique view of said collapsible seat construction in combination with a pivotable end wall upon which the seat construction is supported.

Figure 3 is a sectional view substantially as taken along the line III—III in Figure 2.

Figure 4 is a sectional view substantially as taken along the line IV—IV in Figure 3, said seat construction being in a partially collapsed position.

Figure 5 is a fragment of Figure 1 with the seat construction in an almost completely collapsed position.

Figure 6 is an oblique view generally similar to Figure 2 illustrating a modification.

Figure 7 is a sectional view taken along the line VII—VII of Figure 6.

For convenience in description, the terms "upper," "lower" and derivatives thereof will have reference to the seat construction of the invention and parts associated therewith as appearing in Figures 1 and 2. The terms "front," "rear" and derivatives thereof will have reference to the normal direction of movement of a shopping cart upon which said seat construction is mounted. The terms "inner," "outer" and derivatives thereof will have reference to the geometric center of said collapsible seat and parts associated therewith.

*General description*

The objects and purposes of the invention, including those set forth above, have been met by providing an improved collapsible seat construction which is supported upon the end wall of an article receiving basket for a shopping cart. In this embodiment, the shopping cart is of the nesting type wherein the said end wall is pivotally supported for movement around a substantially horizontal axis between a position closing one end of said basket and a substantially horizontal position into which it is moved during a nesting operation. The seat construction is comprised of a support member which is pivotally mounted upon said end wall and pivotally engages and supports the upper edge of a back member, the lower edge of which is pivotally secured to and supports one edge of a seat frame. Guide means on the end wall slidably engages the other edge of the seat frame for controlling its movement between a collapsed position adjacent to and parallel with the end wall, and an operating position wherein said seat frame extends approximately perpendicularly from the end wall.

A seat panel is pivotally supported upon the end wall for movement between a position covering the leg openings through the end wall and a position adjacent to, and parallel with, the upper surface of the seat frame when it is opened for occupancy.

*Detailed construction*

The seat construction 10 (Figure 2), which illustrates a preferred embodiment of the invention, is comprised of a U-shaped support member 11, a substantially flat and rectangular back member 12, a substantially flat and rectangular seat frame 13 and a seat panel 14, which are collapsibly supported upon the end wall 17 of an article receiving basket 18 (Figure 1) of a shopping cart 16. The shopping cart 16 may be of a known type, such as that disclosed in patent application Serial No. 730,944 filed on April 25, 1958, now Patent No. 2,911,227, issued November 3, 1959, and assigned to the assignee of this application. Briefly, the basket 18 is supported upon means including the handle frame 19 of the cart 16, which frame has a substantially horizontal brace rod 20 near the upper end thereof.

The end wall 17 has a pair of spaced, integral hooks 22 and 23 (Figure 2) extending upwardly from the rail 24 defining the upper edge of said end wall, which is preferably substantially flat and rectangular in shape. Said hooks 22 and 23 pivotally engage means, such as the brace rod 20 (Figure 3), whereby said end wall is movable around a substantially horizontal axis and between its solid line, substantially vertical position 17, blocking the rear end of the basket 18, and its broken line, substantially horizontal position 17a, which leaves the rear end of the basket 18 open.

Although the seat is disclosed in detail in combination with a pivoted end wall 17 of a nesting type shopping cart 16 of a particular type, it will be understood that such is for illustrative purposes only and is not intended to limit the scope of the invention. For example, at least some of the objects and purposes of the invention can be met by mounting said construction upon a fixed end wall of an article receiving basket on a shopping cart of any convenient conventional fixed end type.

The support member 11 includes a pair of substantially parallel, co-extensive link rods 26 and 27 which are interconnected at the lower ends of each by a preferably integral cross rod 28. The support member 11 is pivotally mounted upon the end wall 17 (Figures 1 and 2), near to but in this embodiment spaced upwardly from the bottom rail 29 defining the lower edge of said panel, by means of the hinge mechanism 31 for movement around a hinge axis which is spaced downwardly from and is parallel with the pivot axis of the end wall 17 defined by the brace rod 24. The hinge mechanism 31 in this embodiment includes an elongated hinge support rod 32 secured to the front side of the end wall 17. The cross rod 28 of the support member 11 is parallel with, and bears against, the upper surface of the hinge support element 32 and the adjacent surface of the end wall 17, where it is pivotally held by means of the spaced hinge loops 33 and 34, which may be integral with said end wall 17.

The back member 12 (Figures 1 and 2), which is preferably substantially rectangular in shape, includes upper and lower substantially parallel rails 36 and 37. The upper rail 36 is pivotally engaged by, and supported upon, loops 38 and 39 at the upper ends of the link rods 26 and 27, respectively. Thus, said back member 12 is pivotally supported upon the support member 11 for movement around a substantially horizontal axis parallel with the brace rod 24. Two pairs of elongated spaced and parallel guide elements 42, 43, 44 and 45 are supported upon the end wall 17 (Figure 2), so that they define a pair of parallel guide slots 47 and 48, which are on opposite sides of the end wall 17 and extend downwardly from the upper rail 24 to points located between the support rod 32 and the upper rail 24 of the end wall 17. In this particular embodiment, the guide slots 47 and 48 open sidewardly.

The seat frame 13 (Figures 2 and 3) is comprised of a pair of spaced, substantially parallel side elements 51 and 52 which are secured to the opposite ends of a plurality of spaced, substantially parallel seat elements 53. The rearward ends of the side elements 51 and 52 (Figure 3) have sidewardly extending end portions 54 and 55, respectively, which are slidably received in the guide slots 47 and 48, respectively, for sliding movement lengthwise of said slots. The frontward ends of the side elements 51 and 52 have integral loops 57 and 58, respectively, which pivotally engage the lower rail 37 of the back member 12 near the ends thereof.

The link rods 26 and 27 of the support member 11 are slidably engaged by the seat frame 13 near the opposite sides thereof, such engagement being effected in this embodiment, by arranging the support member 11 so that the link rods 26 and 27 extend through the seat frame between the seat elements 53a and 53b adjacent to the side elements 51 and 52, respectively. The frontward seat element 53b has raised portions 61 and 62 adjacent to the side elements 51 and 52, respectively, which are substantially above the plane defined by the remaining seat elements 53. The link rods 26 and 27 are received into the recesses formed by the portions 61 and 62 when the seat frame 13 is moved into its substantially collapsed position, as appearing in Figure 5. Thus, there is no interference between the seat elements 53 and the support rods 26 and 27 during the collapsing operation.

The end wall 17 has a pair of leg openings 63 and 64 between the upper rail 24 and a line parallel with said upper rail and disposed below the lower ends of the guide slots 47 and 48.

The seat panel 14 is pivotally supported upon the front surface of the end wall 17 by means of the pivot brackets 66 and 67 for movement around an axis just above the lower ends of the leg openings 63 and 64 and substantially parallel with the upper rail 24. Said seat panel 14, which is preferably substantially rectangular, is movable into a substantially upright, broken line position 14a adjacent to the end wall 17 (Figure 2) and substantially blocking the leg openings 63 and 64. Said panel 14 is also movable into a substantially horizontal position 14b resting upon the upper surface of the seat frame 13 when the seat construction 10 is in its open position as appearing in Figure 2. As shown in Figure 4, the seat panel 14 is automatically moved into its upright position adjacent to the end wall 17 by the rearwardmost seat element 53c as said seat frame is pivoted upward into its collapsed position adjacent to the end wall 17.

It will be seen from the foregoing description that the various parts and elements of the support member 11, the back member 12, the seat frame 13 and the end wall 17 can be, and preferably are, fabricated from metallic rods which are connected where necessary by welding. The seat panel 14 can be made from any convenient sheet material, such as sheet metal or sheet plastic. The seat construction 10 is preferably, but not necessarily, entirely supported upon the end wall 17 and is designed with the purpose of being used with an end wall 17 which is pivotally supported to permit nesting of the shopping cart of which it is a part. However, the seat construction 10 can be mounted upon an end wall of a basket 18 which is rigidly held with respect to the basket, if desired.

Operation

When the seat construction 10 is in its open position with respect to the end wall 17, as appearing in Figure 2, said seat construction is ready for immediate occupancy by a child, who is seated upon the panel 14 while his legs extend through the leg openings 63 and 64. As shown in Figure 1, the front edge of the seat frame 13 is indirectly supported upon the end wall 17 by means of the back member 12 and the support member 11. The rear edge of the seat frame 13 is directly supported upon the end wall 17 by engagement of the end portions 54 and 55 with the guide elements 42 and 44, respectively. The support member 11 is prevented from pivoting frontwardly by the engagement of the link rods 26 and 27 (Figure 3) with the seat element 53b of the seat frame 13.

If it is desired to use the seat construction 10 for holding small or easily damaged articles, the seat panel 14 is manually engaged and pivoted from its solid line position 14b in Figure 2 into its broken line position 14a. In this position, the seat panel 14 blocks the leg openings 63 and 64.

When the seat construction is not needed, it can be quickly collapsed against the end wall 17 by grasping the back member 12 and moving it rearwardly toward the end wall 17. In so doing, the link rods 26 and 27 (Figure 3) engage the seat element 53a and thereby cause the end portions 54 and 55 to engage the guide elements 43 and 45 and move upwardly along the slots 47 and 48 while the seat frame 13 pivots around the lower rail 37 on the back member 12. Such upward pivoting of the seat frame 13 causes the rear seat element 53c to engage the seat panel 14 and pivot it from its solid line position 14b in Figure 2 through its broken line position 14c in Figure 4 into its solid line position in Figures 4 and 5.

If it is now desired again to use the seat construction 10 for the purpose of carrying small articles, the seat structure is opened by grasping the upper rail 36 and pushing same forwardly. This moves the rearward edge of the seat structure 13 downwardly through the slots 47 and 48 and, because of the linkage connections, the seat frame 13 and the back 12 all pivot again into the position shown in Figures 1 and 2. However, the seat panel 14 will in this instance remain in its upright position 14a covering the leg openings 63 and 64 as shown in broken lines in Figure 2.

If, on the other hand, it is desirable to use the seat construction 10 for a child, the upper rail is pushed forward in the same manner as above described and the seat opens into the position shown in Figure 1. The seat panel 14 is then pivoted by hand from the broken line position 14a in Figure 2 to the solid line position 14b appearing therein.

Alternatively, if desired, this same result may be accomplished by pushing forwardly on the upper edge of the seat panel 14 through one of the leg openings 63 or 64.

When another shopping cart, similar to the shopping cart 16 and having a basket 18a (Figure 1), is nested with said cart 16, the end wall 17 is engaged by the front end of the basket 18a and is moved from its solid line position in Figure 1 into its broken line position 17a. During this movement of the end wall 17, the seat construction 10 will reach a point where the force of gravity acting upon the back member 12 and the support member 11 will automatically collapse said seat construction rearwardly against the end wall 17 while, at the same time, causing the seat panel 14 to move into its Figure 5 position. Under some circumstances, the effect of gravity may be augmented by engagement between the back member 12 and a portion of a still further shopping cart, not shown, with which the shopping cart 16 has been previously nested. When the end wall is in its broken line position 17a, the seat construction is in its broken line position 10a (Figure 1).

When the basket 18a is removed from its nested position within the basket 18, the end wall pivots downwardly by gravity into its Figure 1 position, but the seat construction remains in the collapsed position. Opening of the seat construction for use as a baby seat or article container can be processed as set forth above.

Modification

Figures 6 and 7 illustrate a modification which will be found useful in many instances.

Most of the parts of the structure shown in Figures 6 and 7 are identical with those shown in Figures 1 to 5, inclusive, are correspondingly numbered in Figures 6 and 7 and need no further description. The difference lies in the shortening of links 26 and 27 and mounting their upper ends on a cross-bar located below the upper edge of the back structure.

In Figures 6 and 7, the links 26a and 27a, corresponding in function to the links 26 and 27 in Figures 1 to 5, inclusive, are each pivotally anchored at their lower ends to a point on the end gate 17 in the same manner as above described in connection with the links 26 and 27. The upper ends of the links, however, pivotally engage a rod 70 which is located, in this embodiment, about half way between the upper and lower ends of the back structure 12a, and is parallel with the upper and lower edges thereof. The rod 53b is moved forwardly from its position as shown in Figure 4 sufficiently, as indicated at 53d in Figure 7, that it will accommodate the slightly different position taken by the links 26a and 27a and preferably sufficiently to provide clearance between the rod 53d and the links 26a and 27a when the seat is in its fully opened position.

The advantage of this modification is that it shortens the links 26a and 27a as compared to the links 26 and 27, thereby resulting in greater strength for the overall structure without increasing the size of the stock used for the links 26a and 27a. Further, it provides a clear space between the rod 70 and the upper edge 36 of the back 12a for the positioning of a store chart.

The general operation of this modification is the same as described in connection with Figures 1 to 5, inclusive, and will be readily understood without further elaboration.

Although a particular preferred embodiment of the invention has been disclosed above in detail for illustrative purposes, it will be understood that variations or modifications of such disclosure, which lie within the scope of the appended claims are fully contemplated.

What is claimed is:

1. A collapsible seat structure for a shopping cart having an article receiving basket with an end wall, said end wall having leg openings in the upper portion thereof, comprising: a support member mounted upon said end wall for pivotal movement around a substantially horizontal first axis between a first position where the upper end of said support member is adjacent said end wall and a second position where it is spaced therefrom; a back member pivotally suspended from said support member for movement around a second axis parallel with and spaced from said first axis; a seat member pivotally supported near one edge thereof upon said back member for movement around a third axis spaced from and parallel with said second axis between a position where it extends between and substantially transverse to said end wall and said support member when said support member is in said second position and a position where it is substantially parallel therewith when said support member is in said first position; means on said seat member between said one edge and a remote, substantially parallel edge thereof slidably engaging said support member for blocking movement of said support member beyond said second position when said seat member extends transverse to said support member; and guide means on said end wall spaced upwardly from said first axis and slidably engaging said seat member along said remote edge thereof for movement toward and away from said first axis, said guide means including means for supporting said remote edge when said seat member is in a position extending substantially transverse to said end wall, said seat member being pivoted through an angle of less than approximately 90 degrees in response to pivotal movement of said support member between said positions thereof.

2. A collapsible seat structure for a shopping cart having an article receiving basket with an end wall, said end wall having leg openings in the upper portion thereof, comprising: a support member comprised of a pair of spaced, substantially parallel elements supported near one end of each upon said end wall for pivotal movement around a substantially horizontal first axis spaced from the upper and lower edges of said end wall between a first position where the upper end of said support member is adjacent said end wall and a second position where it is spaced therefrom; a back member pivotally suspended from said elements near their upper ends for movement around a second axis parallel with and spaced from said first axis; a seat member pivotally supported near one edge thereof upon said back member for movement around a third axis spaced from and parallel with said second axis between a position where it extends between and substantially transverse to said end wall and said support member when said support member is in said second position and a position where it is substantially parallel therewith when said support member is in said first position; means on said seat member between said one edge and a remote, substantially parallel edge thereof slidably engaging said elements for blocking movement of said elements beyond said second position when said seat member extends transverse to said elements; and guide means on said end wall spaced upwardly from said first axis and slidably engaging said seat member along said remote edge thereof for movement toward and away from said first axis, said guide means including means for supporting said remote edge when said seat member is in a position extending substantially transverse to said end wall, said seat member being pivoted through an angle of less than approximately 90 degrees in response to pivotal movement of said elements between said positions thereof.

3. A collapsible seat structure for a shopping cart having an article receiving basket with an end wall, said end wall having leg openings in the upper portion thereof, comprising: a support member comprised of a pair of spaced, substantially parallel support elements pivotally supported upon said end wall for movement around a substantially horizontal, first axis spaced from the upper and lower edges of said end wall between a first position where the upper end of said support member is adjacent said end wall and a second position where it is spaced therefrom; a back member pivotally supported at a point spaced above its lower edge upon said support elements for movement around a second axis spaced from and parallel with said first axis; a substantially rectangular seat frame pivotally supported near one edge upon said back member for movement around a third axis spaced from and parallel with said first and second axes between a position where it extends between and substantially transverse to said end wall and said support member when said support member is in said second position and a position where it is substantially parallel therewith when said support member is in said first position; first guide means on said end wall spaced upwardly from said first axis and slidably engaging said seat frame along the opposite edge thereof for movement toward and away from said first axis, said guide means including means for supporting said remote edge when said seat member is in a position extending substantially transverse to said end wall; and second guide means on said seat frame spaced from said edges thereof and slidably engaging said support elements for blocking movement of said elements beyond said second position when said seat frame extends transverse thereto, said seat frame being movable between a position substantially parallel with said end wall and a position substantially perpendicular to said back member in response to pivotal movement of said elements between said positions.

4. The structure of claim 3 including a seat panel pivotally supported near one edge thereof upon said end wall for movement around a substantially horizontal fourth axis located near the lower end of said first guide means, said panel being movable between a first position above said fourth axis adjacent to and parallel with said end wall and a second position adjacent to and parallel with said seat frame when said seat frame is substantially perpendicular to said back member; and wherein said pair of leg openings are between said fourth axis and the upper edge of said end wall, said leg openings being substantially covered by said panel when it is in said first position.

5. The structure of claim 3 including a seat panel pivotally supported near its rearward edge upon said end wall for movement around a substantially horizontal fourth axis located near the lower end of said first guide means, said panel being movable between a first position above said fourth axis adjacent to and parallel with said end wall and a second position adjacent and parallel with said seat frame when said seat frame is substantially perpendicular to said back member, and including a substantially horizontal member on said seat frame spaced forwardly of said fourth axis for engaging said seat panel at a point spaced from the said fourth axis when said seat frame is moving in a collapsing direction and thereby moving said seat panel upwardly into a position closing said leg openings simultaneously with the collapsing movement of said collapsible seat structure.

6. The structure of claim 3 wherein said seat frame includes a plurality of substantially horizontally positioned rods extending parallel to said end wall and wherein said support elements extend through said seat frame and between a pair of said rods, whereby said rods constitute the means slidably guiding said support elements with respect to said seat frame.

7. The structure of claim 3 wherein said end wall is pivotally supported near the upper edge thereof upon the frame of said cart for movement around a substantially horizontal pivot axis between a substantially upright position closing an open end of said basket and a substantially horizontal position near the upper edge of said basket; and wherein the weight of said back member and said seat frame automatically collapses them into superimposed positions adjacent to and parallel with said end wall as it is pivoted from said upright position into said horizontal position, said seat panel being automatically moved from said frame engaging position into said end wall engaging position during the collapse of the seat frame and the back member.

References Cited in the file of this patent
UNITED STATES PATENTS

| | | |
|---|---|---|
| 1,458,628 | Pardy | June 12, 1923 |
| 2,813,725 | Hoedinghaus et al. | Nov. 19, 1957 |
| 2,837,345 | Young | June 3, 1958 |
| 2,860,885 | Schweitzer | Nov. 18, 1958 |
| 2,890,059 | Brooks et al. | June 9, 1959 |